Figure 1:
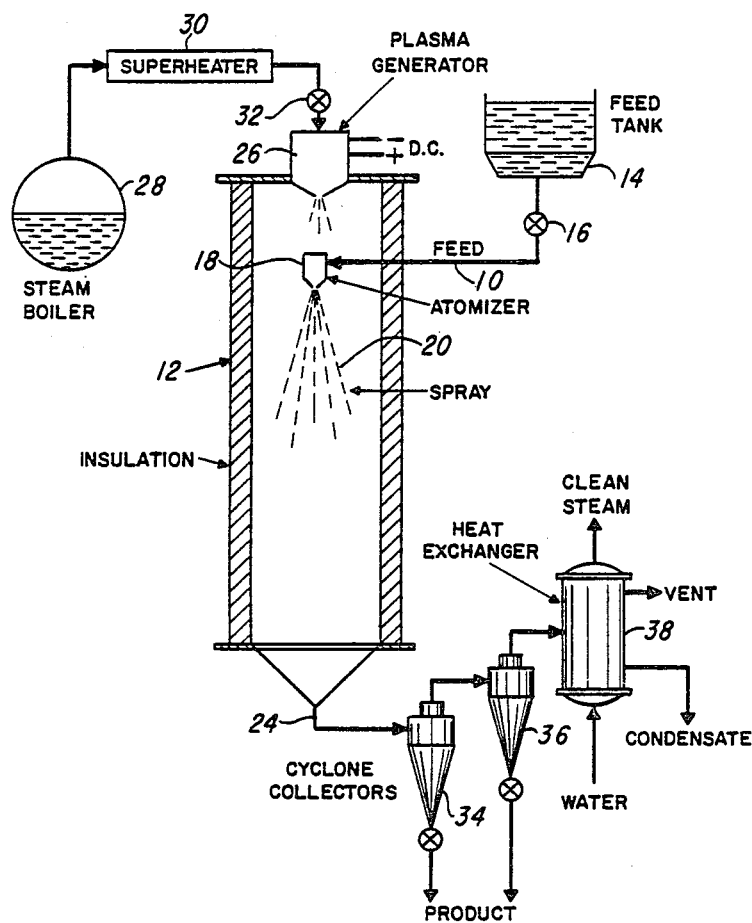

United States Patent [19]

Gauvin

[11] 4,376,010
[45] Mar. 8, 1983

[54] SPRAY DRYING WITH A PLASMA OF SUPERHEATED STEAM

[75] Inventor: William H. Gauvin, Beaconsfield, Canada

[73] Assignee: Noranda Mines Limited, Toronto, Canada

[21] Appl. No.: 254,181

[22] Filed: Apr. 14, 1981

[51] Int. Cl.³ ............................................. F25J 1/16
[52] U.S. Cl. .................... 159/48.1; 159/16 S; 159/4 ST
[58] Field of Search ............ 159/16 S, 4 E, 4 ST, 159/48 R, 48 S

[56] References Cited

U.S. PATENT DOCUMENTS

| | | | |
|---|---|---|---|
| 1,350,248 | 8/1920 | Stutzke | 159/4 ST |
| 1,426,030 | 8/1922 | Zimmerman | 159/4 K |
| 1,917,841 | 7/1933 | Hughes et al. | 159/16 S |
| 2,702,949 | 3/1955 | Parker, Jr. | 159/4 ST |

OTHER PUBLICATIONS

The Condensed Chemical Dictionary, Eighth Ed., Van Nostrand Reinhold Co., 1971, p. 698.

*Primary Examiner*—Norman Yudkoff
*Attorney, Agent, or Firm*—Fleit, Jacobson & Cohn

[57] ABSTRACT

A process and a system for drying a solution, a slurry or a solid suspension of a material non-sensitive to heat is disclosed. A spray of finely divided particles is formed in a chamber and a plasma of superheated steam is used as the heat source for drying the particles as they pass through the chamber. The resulting product is removed from the chamber in the form of a suspension of dry particles in superheated steam.

11 Claims, 2 Drawing Figures

SPRAY DRYING WITH A PLASMA OF SUPERHEATED STEAM

This invention relates to drying of aqueous solutions, slurries or solid suspensions of materials and, more particularly, to spray drying of finely divided particles using steam as the drying medium.

Spray drying is a common processing operation whereby solids dissolved in an aqueous solution or present in the form of a slurry are dried to a finely divided powdery product. Conventionally, the process consists of atomizing the solution or slurry in the form of finely divided droplets which are then evaporated and dried in contact with a current of hot air at elevated temperature which acts as the drying medium. Since very large volumes of drying air are required, conventional spray dryers are characterized by their very large size. To operate these commercial spray dryers under pressure would require very thick walls, and the cost would be prohibitive. Hence, pressure operation is never practised.

In previous U.S. Pat. No. 2,889,874, the inventor of the present application has shown that an atomized spray of finely divided droplets of a solution or of a slurry can be effectively dried in the water vapour generated by the evaporation of water from the droplets, without addition of any gaseous drying medium, provided that sufficient heat is added to the system to provide the necessary heat of vapourization. In this patent, the walls of the chamber were heated to a temperature ranging from 600° C. to 1,000° C. to provide the necessary heat by radiation and convection to the slowly descending cloud of droplets suspended in their own steam. Although this method resulted in considerable reduction in the size of the drying chamber and, therefore, in capital cost, with appreciable savings in operating cost as well, it suffered from two defects which limited its usefulness: (1) the mechanism of heat transfer from the hot wall to the descending cloud of droplets was by radiation and convection and the resulting rate of heat transfer was too low for high commercial throughputs; (2) the walls maintained at high temperature were very susceptible to corrosion when impacted by droplets or by dried particles from the drying cloud. For the drying of certain chemicals (for example, solutions containing sodium carbonate or sodium sulphate), the corrosion was so severe that it was necessary to use very expensive alloys to provide the necessary corrosion resistance.

It has now been surprisingly discovered that a plasma of superheated steam at very high temperature can advantageously be used as the heat source for the process. Since the walls of the drying chamber are no longer heated but, on the contrary, are at a much lower temperature than the drying cloud of droplets they contain, the corrosion problem mentioned in the previous section no longer exists.

The development of commercial scale generators of water vapour plasma has been pioneered by Alusuisse, based on U.S. Pat. Nos. 3,649,497, 3,658,673 and 3,712,996, issued to T. Kugler et al. These torches are now available in nominal power ratings of 200 kW. It is also known that Westinghouse has conducted successful tests on the production of water vapour plasmas through their commercial plasma torches, as disclosed by Fey, M. G., in an article entitled "Electric Arc (Plasma) Heaters for the Process Industries," Industrial Meeting, pages 2–8 (June 1976). The interest in the water vapour plasmas generated by electric arcs has remained relatively dormant until, recently, Sheer, Korman and Dougherty published an article entitled "Arc Gasification of Coal", Proceeding of the 4th International Symposium on Plasma Chemistry, pages 274–294 (Zurich, Aug. 29, 1979). As far as it is known, none of the above plasma devices have been used in commercial operations and certainly none of them have been applied to spray drying.

The process, in accordance with the invention, comprises the steps of providing a spray of finely divided particles of a material not sensitive to heat in a chamber, generating a plasma of superheated steam within the chamber so as to surround the particles of material with the superheated steam and dry the same with the superheated steam while they pass through the chamber, and removing the resulting dried product from the chamber in the form of a suspension of dry particles in the superheated steam.

The exiting stream from the chamber which consists of a suspension of dry particles in superheated steam is fed to a train of cyclone collectors or to a baghouse for separating the dry particles from the superheated steam. The steam which has been separated from the finely divided particles is preferably fed to a heat exchanger for recovering the total latent heat contained in the plasma steam and the steam driven off by evaporation from the finely divided particles.

The steam fed to the plasma generators is preferably generated by a boiler. Such boiler may be operated at an elevated pressure and the steam thus sent to the plasma generators at such elevated pressure to form a plasma of superheated steam under pressure, thus avoiding the heavy cost of compressing the chamber when needed.

Figure 2:
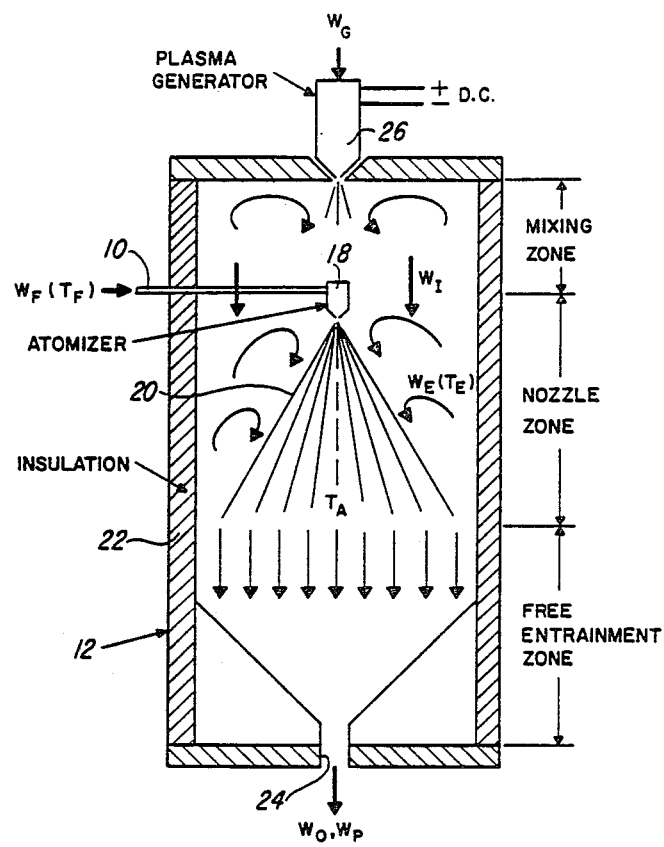

The invention will now be disclosed, by way of example, with reference to the accompanying drawings in which:

FIG. 1 shows a schematic layout of a spray drying system in accordance with the invention; and FIG. 2 is a detailed schematic view of the spray drying chamber of the system shown in FIG. 1.

Referring to FIGS. 1 and 2, an aqueous solution or slurry is supplied to a line 10 which extends through the wall of a chamber 12. Line 10 is heat insulated. It is further cooled by the cold feed liquid. The solution may be contained in a feed tank 14 and fed to line 10 through a valve 16 at a predetermined flow rate $W_F$ and temperature $T_F$. An atomizer 18 is mounted at the end of line 10 for forming a finely divided or atomized spray 20 of the aqueous solution or slurry being supplied to the line 10. The preferred atomizing device to be used is a high pressure (from 1,000 to 4,000 psi or about 7,000 to 20,000 kPa) narrow-angle (40°) non-swirl pressure nozzle commercially available in all sizes, up to capacities of 5,000 kg of solution per hour and higher. The droplet size distribution produced by these nozzles is commonly known. It is to be understood that other types of atomizers could be used depending on the particular application. The chamber is heat insulated by any suitable insulating material 22 and at least the inside wall is constructed of metal or other material such as refractories, resistant to the corrosion which may be caused by the particular liquid or slurry being supplied to the atomizer 18. As shown in FIG. 2, the chamber comprises three zones, namely a mixing zone, a nozzle zone and a free entrainment zone to be disclosed more fully in a later part of the disclosure. The chamber is also preferably cylindrical in cross section and tapered at its lower end to communicate with an outlet 24.

The chamber is heated by a plasma generator 26 capable of generating a plasma of superheated steam. Generation of the plasma can be effected by a number of means, such as by a transferred arc between a single cathode and one or more water cooled anodes. Steam, as produced by a steam boiler 28 and heated to a temperature above the boiling point of water by a superheater 30, is fed to the plasma generator through a valve 32 at a predetermined flow rate $W_G$ and pressure. The steam which is fed to the plasma generator constitutes the plasmagen gas. It is to be understood that a plurality of plasma generators may be positioned at suitable locations in the chamber to generate the required amount of superheated steam.

The inventor has successfully demonstrated the generation of plasma of superheated steam in a commercial 50-kW Thermal Dynamics plasma torch, using a small stream of argon to protect the cathode tip from the aggressive action of dissociated steam, and the voltage current characteristics have been obtained. For example, a voltage drop of 36 volts was observed between cathode and anode, for a current of 530 amperes. Measurements of the temperature of the plasma with a calorimetric probe have shown that, depending on the power used, this device is capable of generating a stream of plasma at temperatures as high as 13,000° K. but the temperature rapidly decreases as the plasma jet expands. From these tests done by the inventor, it has been found that a temperature of 6,000° K. at the torch nozzle is sufficient for the purpose of spray drying and that the above torch is fully capable of producing such a temperature. Water vapour begins to dissociate around 2,000° K. at 1 atmosphere and dissociation into hydrogen and oxygen is about complete at 6,000° K. Ionization begins to occur above 8,000° K. Ionization begins to occur above 8,000° K.

At 6,000° K. and 1 atmosphere, the enthalpy of steam is extremely high ($7.36 \times 10^7$ J/kg, measured over the enthalpy of saturated water at 0° C., taken as 0) owing to the unusually high heat of dissociation. This value decreases slightly to $7.15 \times 10^7$ J/kg at 10 atmospheres and the same temperature. Thus, injection of very small amounts of water vapour plasma is an ideal heat source in a drying chamber, permitting very much higher rates of heat transfer than were possible with the indirect heat transfer by radiation and convection from heated walls as disclosed in the above mentioned U.S. Pat. No. 2,889,874.

The plasma jet expands in the mixing zone of the chamber as shown in FIG. 2 and entrains a portion of the surrounding fluid downwardly at a mass flow rate $W_I$ which is sufficient to dry the finely divided particles of the spray.

The nozzle zone indicated in FIG. 2 can be considered as a geometrically well-defined entity impervious to the surrounding atmosphere, except for entrainment effects from the latter into the spray. This all important pumping effect is indicated as $W_E$ on FIG. 2. Since the amount of $W_E$ of high-temperature steam at temperature $T_E$ entrained within the spray is small and controlled by the fluid mechanics of the system, the average temperature in the spray, $T_A$ is the result of the mixing of the entrained high-temperature steam with the much cooler water vapour generated at the boiling point of the evaporating droplets within the spray and is therefore much lower than the surrounding high-temperature steam. As long as any moisture remains in the drying particles, the latter remain at or close to their boiling point. If not withdrawn quickly when dry, their temperature may rise in the lower region. This means that this method of spray drying may not be applicable to the drying of heat sensitive materials.

When the droplets in the spray have decelerated to a velocity approaching the terminal velocity, the jet breaks and the droplets now enter what is called the free entrainment zone, as indicated on FIG. 2, at which point the steam in the spray and the surrounding steam mix freely. As the rate of evaporation in the nozzle range is extremely high, there is a strong possibility that the particles may be completely dry by the time the jet breaks. If not, drying continues while the particles are conveyed by the mixed steam in the lower region of the chamber. Drying conditions in this zone are rather mild, since the temperature of the ambient mixed steam is now much lower.

The stream exiting from the outlet 24 of the chamber consists of a suspension of dry particles in superheated steam which flows out at a mass flow rate of $W_o$, $W_p$. As illustrated in FIG. 1, the dry particles are removed in a train of cyclone collectors illustrated by references 34 and 36, or in a baghouse (not shown). Any steam remaining in the product bin (not shown) should be thoroughly flushed out with dry air or a dry inert gas (such as nitrogen) to prevent condensation on the product as the latter cools, prior to packaging or utilization. The remaining unclean steam (containing small amounts of uncollected particles and traces of uncondensable gases always present as dissolved gases in the feed solution) is condensed to produce clean steam in the tube side of a shell-and-tube heat exchanger 38. Thus, the total latent heat contained in the plasma steam plus that in the steam driven off by evaporation and drying of the atomized feed can be recovered as clean steam, albeit at a lower temperature, which can be utilized directly for plant use, or in an evaporator system, or it can be recompressed to a higher pressure and temperature level if required to generate electricity. It is evident that recovery of this steam constitutes an element of energy conservation of considerable magnitude.

From the description given above, the following advantages can be cited for this system over conventional spray drying using air:

1. No large volume of drying medium is required, thus considerably reducing the size of the drying chamber.
2. Conventional spray dryers cannot be pressurized. In the present invention, since the steam sent to the plasma generator is produced by a conventional boiler, the latter can be operated at an elevated pressure and sent to the plasma generator at this pressure, thus avoiding the heavy cost of gas compression. In other words, use of high pressure steam from a conventional steam boiler is all that is required to pressurize the chamber.
3. The latent heat in the steam leaving the system at the pressure prevailing in the latter can be recovered for useful purposes. This steam consists of the water driven out from the solution during evaporation plus the small amount of steam used for the production of the plasma of water vapour.
4. Because the enthalpy of a plasma of superheated is so high, a very small amount of plasma steam is required (on the average about 1/24 of the quantity of water to be evaporated).

5. Since the heat present in the steam plasma is transferred directly to the system by mixing, the rate of heat transfer from the heat source is excellent.

For the purpose of illustration, the design of an industrial spray drying chamber for the production of 1,000 kg of product per hour was carried out. The specifications and requirements for this industrial installation are shown in Table I, while the atomizing nozzle specifications are shown in Table II.

TABLE I
SPECIFICATIONS AND REQUIREMENTS

| | |
|---|---|
| Rate of Production of Solid Product | 0.278 kg/s |
| Percent Salt in Feed | 30% |
| Density of Salt Solution | $(922 + 920\ C_F)$ kg/m$^3$ |
| Residual Moisture in Largest Drop | 50% |
| $D_{vs}$* of Dense Product | $95 \times 10^{-6}$ m |
| Chamber Operating Pressure | 1 bar |
| Plasma Steam Temperature | 6 000° K. |
| Feed Termperature (Boiling Point) | 392° K. |
| Heat Losses | 20% of Evaporating Load |
| Chamber Geometry | Cylindrical |

*Sauter mean diameter, as referred to in Gauvin, W.H., and Katta, S., "Basic Concepts of Spray Dryer Design," AIChE JOURNAL, 22, No. 4, pp. 713–724 (1976)

TABLE II
ATOMIZING NOZZLE SPECIFICATIONS

| | |
|---|---|
| Nozzle Type | Pressure |
| Model Number | SB, No. B20 |
| Nozzle Manufacturer | Spraying Systems Co. |
| Operating Pressure | $1.034 \times 10^7$ N/m$^2$ |
| Diameter of Nozzle | 0.00409 m |
| Angle of Spray | 40° (0.698 radian) |
| Spray Droplet Size Distribution | FIG. 1 of Gauvin, W.H., and Katta, S., "Basic Concepts of Spray Dryer Design," AIChE JOURNAL 22, No. 4, pp. 713–724 (1976) |
| Diameter of Largest Droplets | $350 \times 10^{-6}$ Gauvin, W.H., and Katta, S., "Basic Concepts of Spray Dryer Design," AIChE JOURNAL, 22, No. 4, pp. 713–724 (1976) |
| Liquid Velocity at Nozzle | 170 m/s |

The calculations were carried out according to a computer program developed by Gauvin, W. H., and Katta, S., "Basic Concepts of Spray Dryer Design," Aiche Journal, 22, No. 4, pp. 713–724 (1976) referred to in Table I modified for the special case where superheated steam is the drying medium as disclosed by Gauvin, W. H. and Costin, M. K., in an article entitled "Spray Drying in Superheated Steam", A Techno-Economic Study, Drying 1980 (Volume I)—Developments in Drying, Pages 320–331, Hemisphere Publishing Corporation, N.Y. (1980). The results of the design calculations are shown in the following Table III.

TABLE III
RESULTS

| | |
|---|---|
| Radius of Cylindrical Chamber | 0.65 m |
| Height of Cylindrical Chamber | 4.84 m |
| Outlet Temperature | 500° K. |
| Rate of Water Evaporation | 0.648 kg/s |
| Flowrate of Plasma Steam | 0.027 kg/s |
| Power Required by Plasma, Net | 1.93 MW |
| Power Required by Plasma, Gross* | 2.75 MW |
| Heat Losses | 0.322 MW |

*Based on Manufacturer's specification of 70% efficiency for their plasma torch.

The above results clearly indicate the following advantages of the present invention:
1. The diameter of the cylindrical chamber (1.3 meter) and its height (4.84 meters) are considerably smaller than for a conventional spray dryer (a diameter of 9.5 meters and a height of 14.5 meters, as disclosed in Gauvin, W. H. and Costin, M. K., mentioned above), thus considerably reducing the capital cost of the chamber.
2. No blower or compressor is needed for the new system.
3. No expensive gas cleaning system is needed with the new system.
4. The energy requirement of the new system is 2.75 MW, compared with a requirement of 3.34 for conventional spray drying (as disclosed in Gauvin, W. H. and Costin, M. K., mentioned above). In addition, it is possible to recover most of the large amount of energy contained in the exhaust steam (about 1.7 MW).

I claim:
1. A process of drying a solution, a slurry or a solid suspension of material non-sensitive to heat comprising the steps of:
   (a) providing a spray of finely divided particles of said material in a chamber;
   (b) generating a plasma of superheated steam at a temperature higher than 2000° K. within said chamber so as to surround said particles of material with the superheated steam and to dry the same with said steam while they pass through said chamber; and
   (c) removing the resulting product from the chamber in the form of a suspension of said particles in the superheated steam.
2. A process as defined in claim 1, further comprising the step of separating the finely divided particles from the exhaust superheated steam to recover the particles and the superheated steam.
3. A process as defined in claim 2, further comprising the step of passing the exhaust superheated steam through a heat exchanger to recover the total latent heat contained in plasma steam and in the steam driven off by evaporation from the finely divided particles.
4. A process as defined in claims 1, 2 or 3, wherein said plasma of superheated steam is generated under pressure.
5. A system as defined in claim 4, wherein the plasma is generated at a nozzle.
6. A process as defined in claim 1, wherein the generated plasma of superheated steam is at a temperature higher than 6000° K.
7. A system for drying a solution, a slurry or a solid suspension of material non-sensitive to heat comprising:
   (a) means for providing a spray of finely divided particles of said material in a chamber;
   (b) at least one plasma generator for generating a plasma of superheated steam at a temperature higher than 2000° K. within said chamber so as to surround said particles of material with the superheated steam while they pass through said chamber; and
   (c) means for removing the resulting product from the chamber in the form of a suspension of said particles in the superheated steam.
8. A system as defined in claim 7, wherein the stream exiting from the chamber consists of a suspension of dry particles in superheated steam, and further comprising means for separating the finely divided particles from the exhaust superheated steam.

9. A system as defined in claim 8, further comprising means for passing the exhaust superheated steam which has been separated from the finely divided particles through a heat exchanger for recovering the total latent heat contained in the plasma steam and in the steam driven off by evaporation of the finely divided particles.

10. A system as defined in claims 7, 8 or 9, further comprising a boiler for producing steam under pressure for said plasma generator to pressurize the chamber.

11. A system as defined in claim 7, wherein the plasma of superheated steam is generated at a nozzle, and wherein the plasma is at a temperature higher than 6000° K.

* * * * *